(12) United States Patent
Huang

(10) Patent No.: US 7,281,826 B2
(45) Date of Patent: Oct. 16, 2007

(54) HEADBAND WITH MAGNIFYING LENS AND DETACHABLE LIGHT

(75) Inventor: Tsung Hui Huang, Tai Ping (TW)

(73) Assignee: Gem Optical Co., Ltd., Taiping (TW)

( * ) Notice: Subject to any disclaimer, the term of this patent is extended or adjusted under 35 U.S.C. 154(b) by 18 days.

(21) Appl. No.: 10/350,072

(22) Filed: Jan. 24, 2003

(65) Prior Publication Data

US 2004/0145887 A1 Jul. 29, 2004

(51) Int. Cl.
*F21V 21/00* (2006.01)
*F21V 21/08* (2006.01)

(52) U.S. Cl. .............. 362/398; 362/190; 362/191; 362/197; 362/199; 362/106; 362/427

(58) Field of Classification Search ............ 362/398, 362/190, 191, 197, 199, 427, 105, 106
See application file for complete search history.

(56) References Cited

U.S. PATENT DOCUMENTS 3,008,040 A * 11/1961 Moore .................... 362/105
3,087,049 A * 4/1963 Schecter .................. 362/105
4,321,660 A * 3/1982 Sokol ...................... 362/368
5,357,409 A * 10/1994 Glatt ....................... 362/105
6,601,969 B2 * 8/2003 Barton ..................... 362/155
2003/0086257 A1 * 5/2003 Lehrer ..................... 362/105

* cited by examiner

*Primary Examiner*—Thomas M. Sember
*Assistant Examiner*—Jacob Y. Choi
(74) *Attorney, Agent, or Firm*—Lowe Hauptman & Berner, LLP

(57) ABSTRACT

A headband comprises a magnifying lens and a detachable assembly comprising a battery compartment received in a well and including a top recessed member, a ridge in the recessed member, a bottom magnet magnetically connected to the well, and a bottom cover; illumination means including a cavity inside a bottom recess; and connection means including a hollow T-shaped post including a top pivot member, a bottom pivot member having a peripheral groove, and two rounded projections at both sides of the top pivot member for pivotably coupling to the cavity; and a hollow, parallelepiped base including an interior peripheral protrusion matingly coupled to the groove, two opposite side pins pivotably coupled to the recessed member, and a bottom toothed member matingly, pivotably coupled to the ridge. The assembly can be detached by inserting a pointed object into a through hole on the well to disengage the magnet from the well.

2 Claims, 10 Drawing Sheets

HEADBAND WITH MAGNIFYING LENS AND DETACHABLE LIGHT

FIELD OF THE INVENTION

The present invention relates to a headband with magnifying lens and light, and more particularly to a headband with a magnifying lens and a detachable, pivotal light.

BACKGROUND OF THE INVENTION

A conventional headband 1 is shown in FIG. 1. The headband 1 comprises a magnifying lens 2 hingedly coupled to a front end and an illumination assembly 3 pivotably coupled to a top front portion. However, the prior art suffered from several disadvantages. For example, a pivotal angle of the illumination assembly 3 in either horizontal or vertical direction is very limited. Further, the illumination assembly 3 is integrally formed with the headband 1, i.e., undetachable. Hence, an illumination on a working position is not possible if the headband 1 is taken off from the head. This can cause inconvenience while working. Hence, a need for improvement exists.

SUMMARY OF THE INVENTION

It is therefore an object of the present invention to provide a headband comprising a front well having a bottom through hole and a magnetic member on a bottom; a magnifying lens hingedly coupled to a front end; and a detachable assembly comprising: a battery compartment received in the well, the battery compartment including one or more cells, a top recessed member, a ridge in the recessed member, a bottom slotted section, a magnet in the slotted section for magnetically connecting to the magnetic member, and a bottom cover; illumination means including a LED lamp, an on/off switch, an arcuate bottom recess, and a cavity inside the bottom recess; and connection means including a hollow T-shaped post including a top pivot member, a bottom pivot member having a peripheral groove, and two rounded projections at both sides of the top pivot member for pivotably coupling to the cavity; and a hollow, parallelepiped base including an interior peripheral protrusion matingly coupled to the groove, two opposite side pins pivotably coupled to the recessed member, a bottom toothed member matingly, pivotably coupled to the ridge, and electric wires for electrically connecting the cells to the illumination means; wherein in an operation of detaching the detachable assembly, insert a pointed object into the hole to push the battery compartment upward for disengaging the magnet from the magnetic member.

In one aspect of the present invention the post further comprises an indentation proximate the bottom pivot member and the base further comprises a peripheral flange on an interior surface so as to limit pivot angles of the post and the illumination means by causing the flange to contact the indentation during pivoting.

The above and other objects, features and advantages of the present invention will become apparent from the following detailed description taken with the accompanying drawings.

DETAILED DESCRIPTION OF THE PREFERRED EMBODIMENTS

Figure 1:
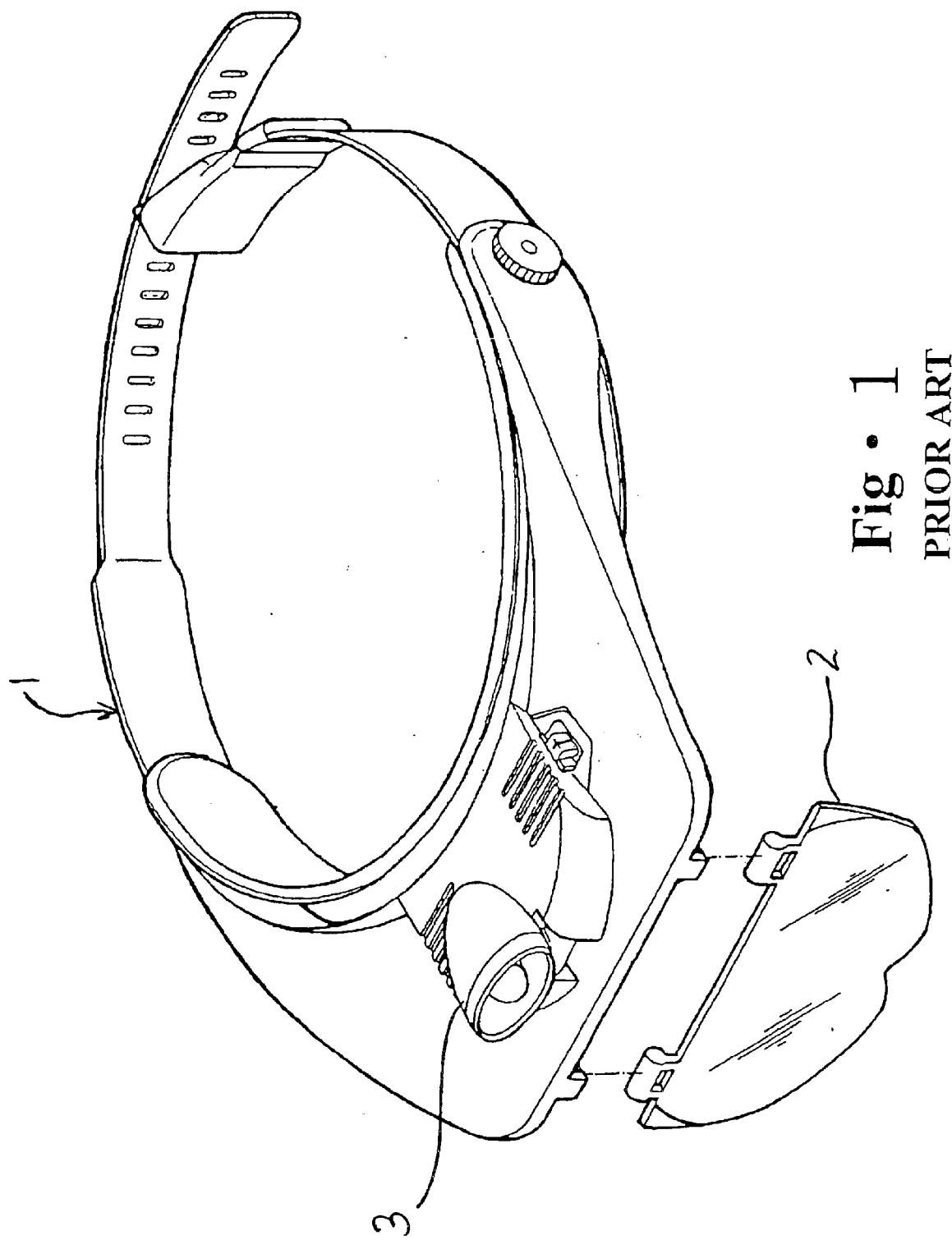
FIG. 1 is a perspective view of a conventional headband with a magnifying lens and an undetachable illumination assembly.
Figure 2:
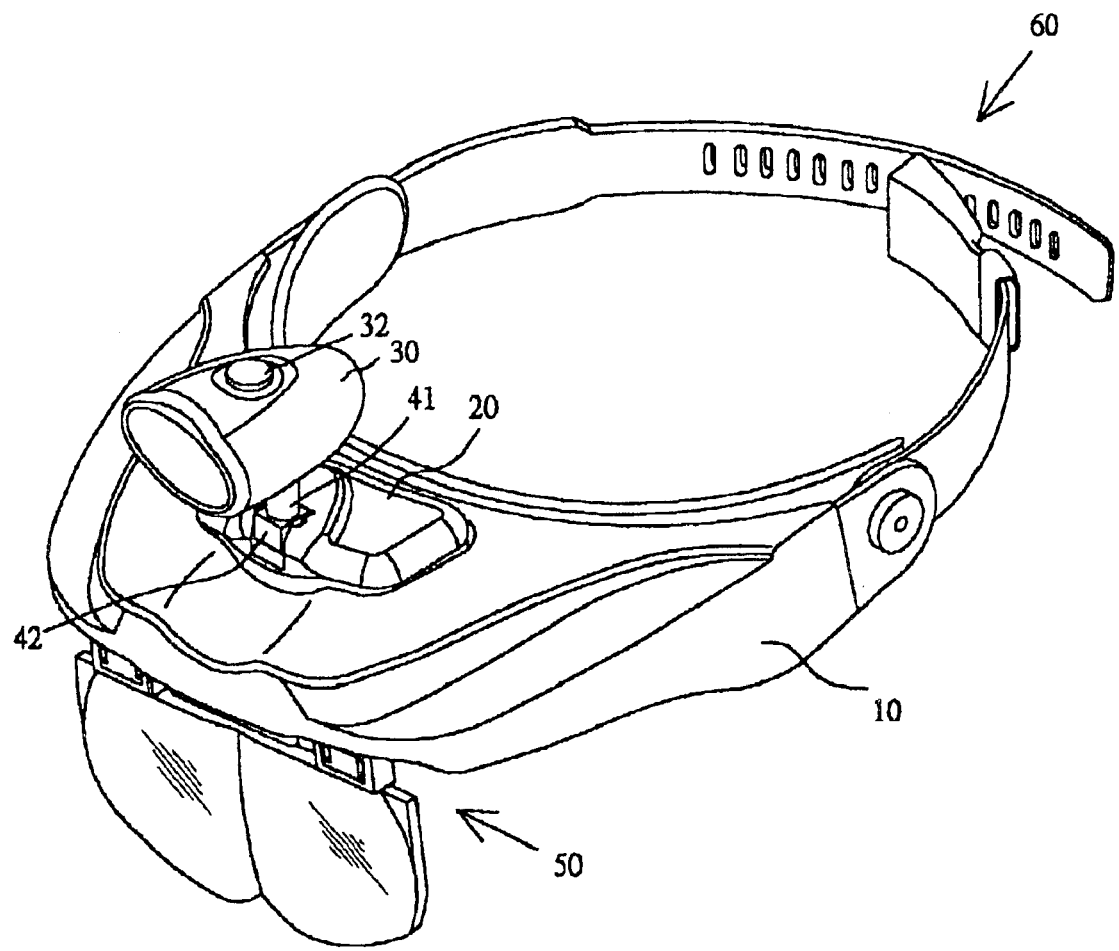
FIG. 2 is a perspective view of a headband with a magnifying lens and a detachable illumination assembly according to the invention.
Figure 3:
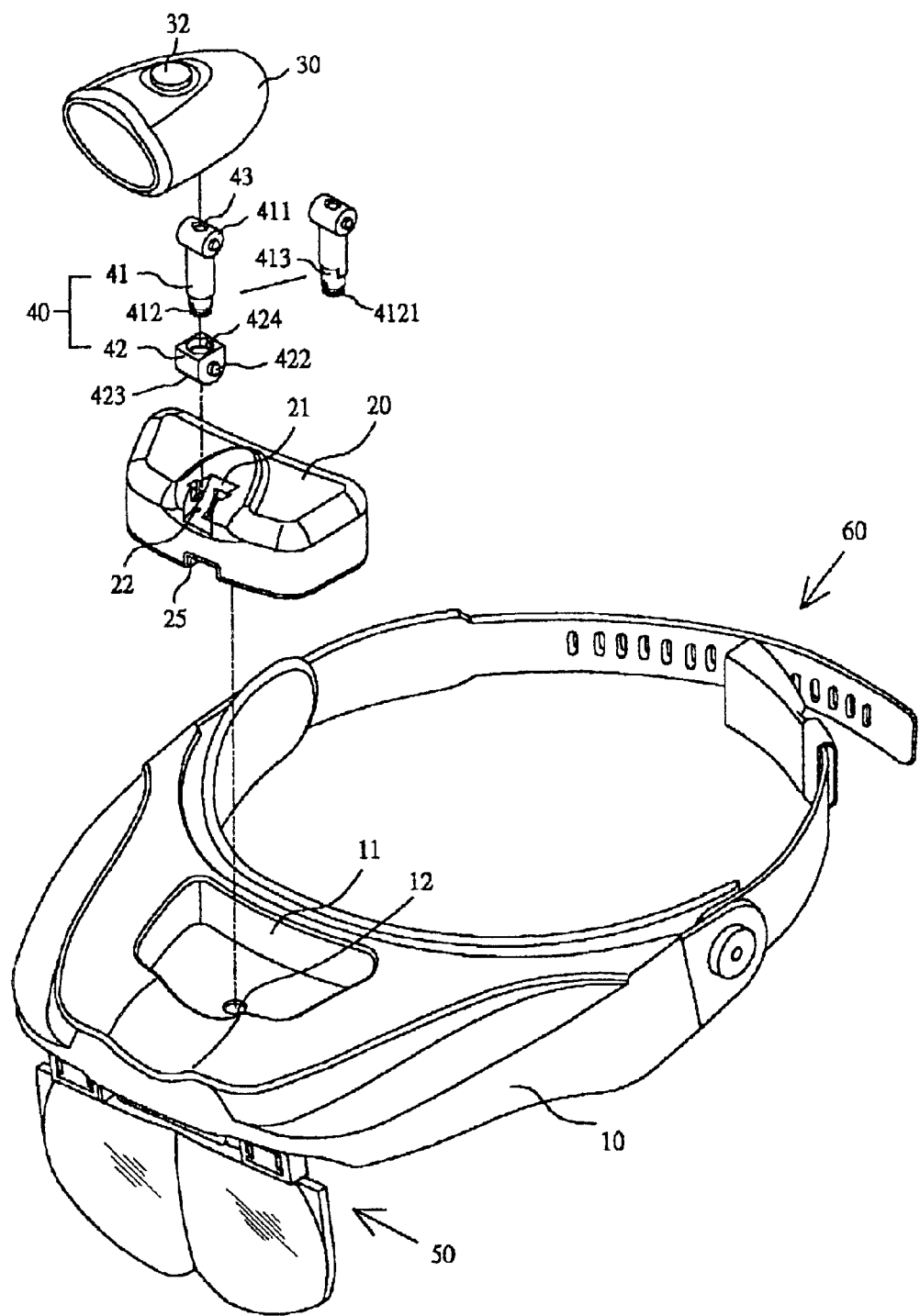
FIG. 3 is a view similar to FIG. 2 with battery compartment, illumination assembly, and connection assembly broken apart.
Figure 4:
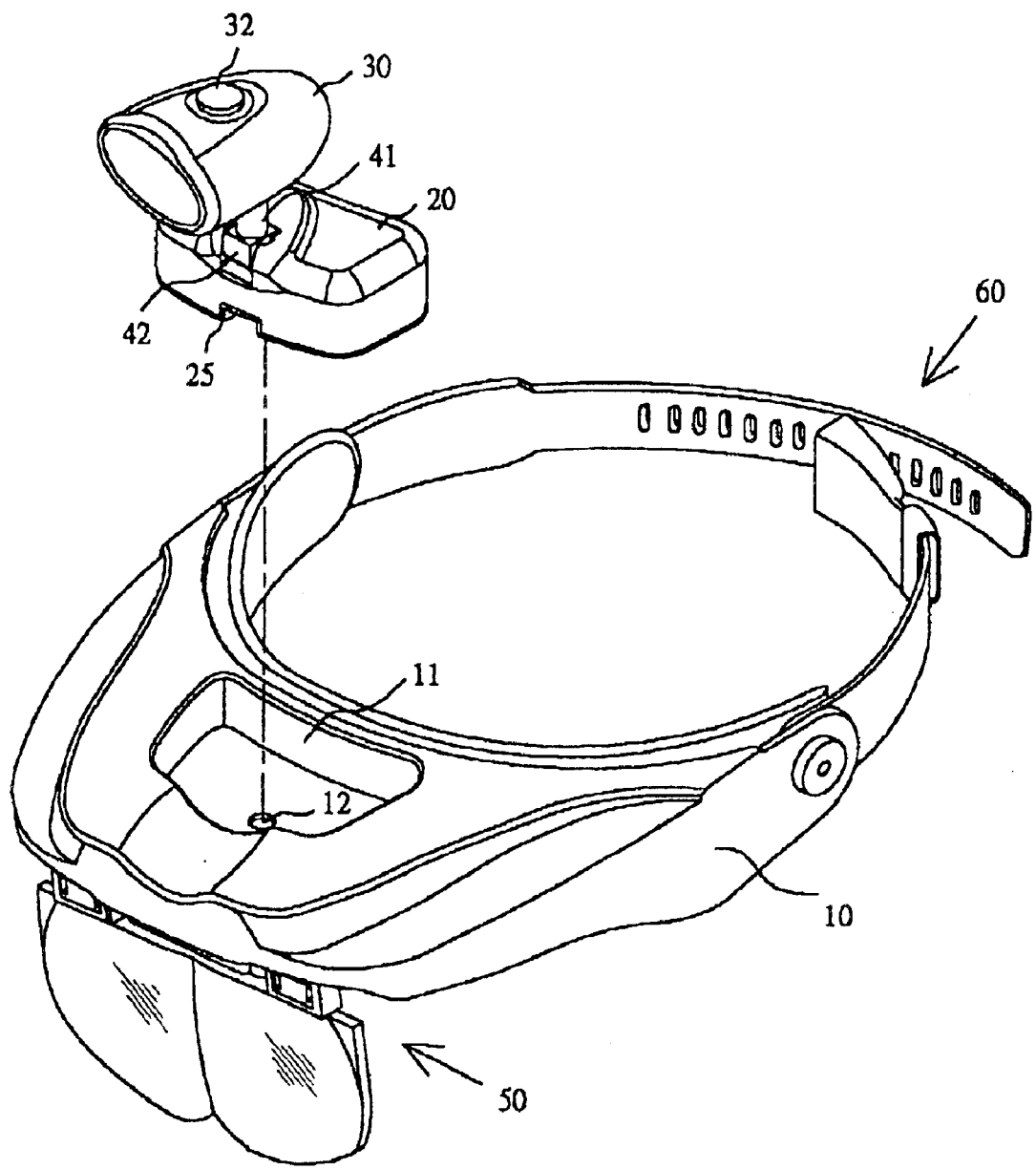
FIG. 4 is a view similar to FIG. 3 with the battery compartment, the illumination assembly, and the connection assembly assembled.
Figure 5:
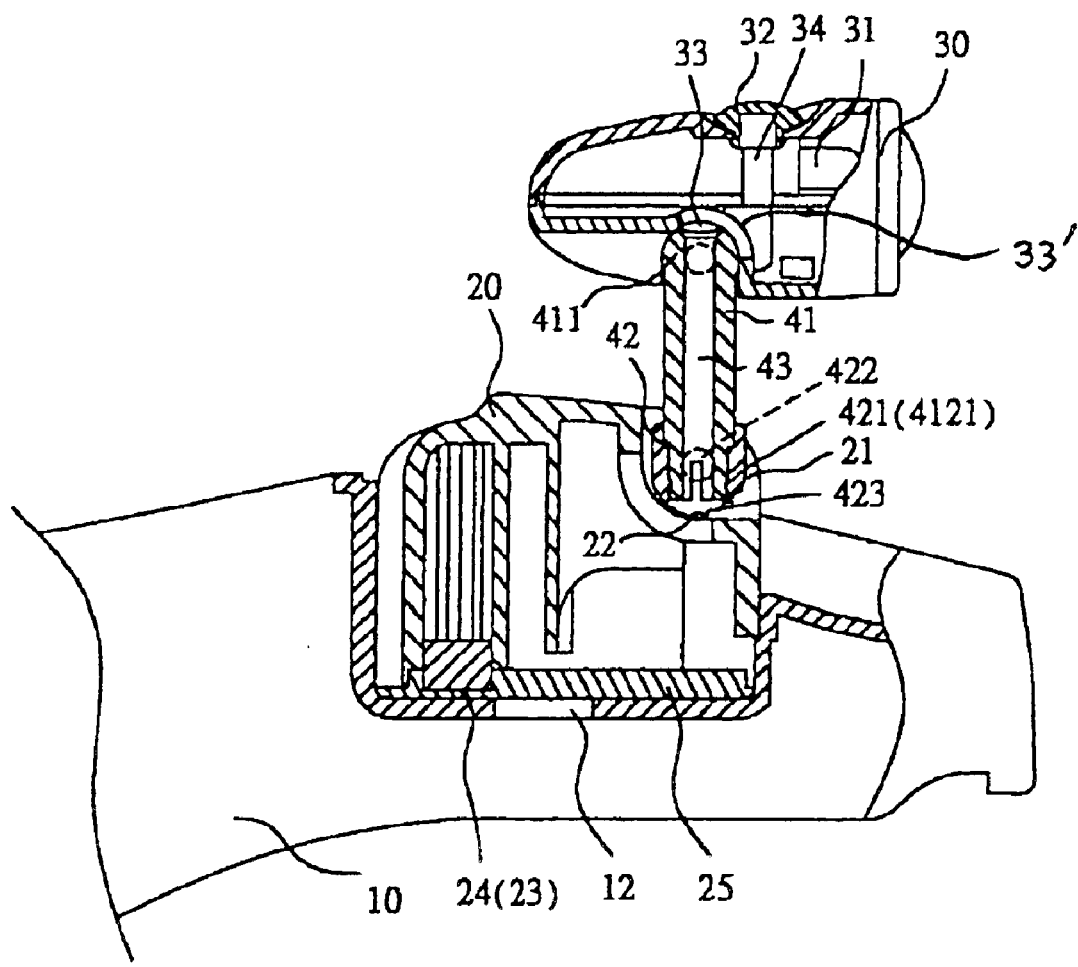
FIG. 5 is a cross-sectional view showing the battery compartment, the illumination assembly, and the connection assembly mounted on a top front portion of the headband.

Referring to FIGS. 2, 3, 4, and 5, there is shown a headband device 10 constructed in accordance with the invention comprising a battery compartment 20, an illumination assembly 30, a connection assembly 40, a magnifying lens 50 hingedly coupled to a front end and a headband unit 60. A front well 11 for receiving the battery compartment 20 and a hole 12 on the bottom of the well 11 in communication with the underside of the headband device 10 are formed. In addition to the well 11 and the hole 12, the characteristics of the invention are the battery compartment 20, the illumination assembly 30, and the connection assembly 40 which will be described in detail below.

The battery compartment 20 is shaped to conform with the well 11 and comprises one or more cells (not shown), a top recessed member 21 pivotably coupled to the connection assembly 40, a ridge 22 in the recessed member 21, a slotted section 23 on the bottom, a magnet 24 mounted in the slotted section 23 for magnetically connecting to an iron or steel member (not shown) on the bottom of the well 11, and a bottom cover 25. The illumination assembly 30 comprises a LED (light-emitting diode) lamp 31, an on/off switch 32 on the top, and a cavity 33 inside an arcuate bottom recess 33' pivotably coupled to the connection assembly 40. The connection assembly 40 comprises a base 42 and a hollow T-shaped post 41 having a top pivot member 411 and a bottom pivot member 412 in which two rounded projections are formed at both sides of the top pivot member 411 for pivotably coupling to the cavity 33 and the bottom pivot member 412 comprises a peripheral groove 4121. The base 42 is a parallelepiped and comprises an interior peripheral protrusion 421 matingly coupled to the groove 4121, two pins 422 on opposite sides pivotably coupled to the recessed member 21, and a toothed member 423 on the bottom matingly, pivotably coupled to the ridge 22. The connection assembly 40 and the illumination assembly 30 further comprise a channel 43 in communication with inside of the base 42 and a passage 34 in communication with the channel 43 respectively so that electric wires (not shown) may be connected from the cells in the battery compartment 20 to the illumination assembly 30 via the channel 43 and the passage 34. As an end, a power on operation of the headband device 10 will enable the illumination assembly 30 to emit light.

The post 41 is permitted to pivot about 360 degrees with respect to the base 42. However, for avoiding the operation of the illumination assembly 30 from being adversely affected by such large angle pivot of the post 41, the pivot angle of the post 41 should be limited. Preferably, a lower portion of the post 41 adjacent the bottom pivot member 412 is suitably cut around the surface to form an indentation 413. Further, a peripheral flange 424 is formed on the interior surface of the base 42. Hence, the pivot angle of the post 41 is limited when the flange 424 is in contact with the indentation 413 during pivoting.

Figure 6:
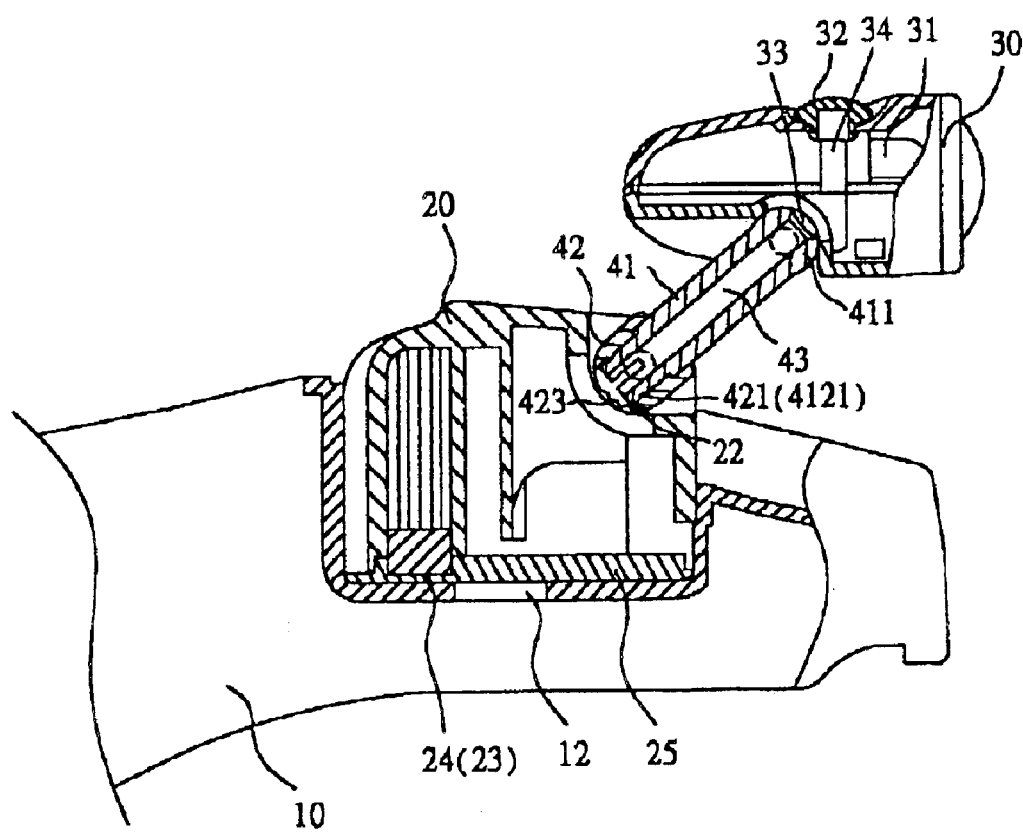
FIG. 6 is a view similar to FIG. 5 showing a pivotal operation of the connection assembly.
Figure 7:
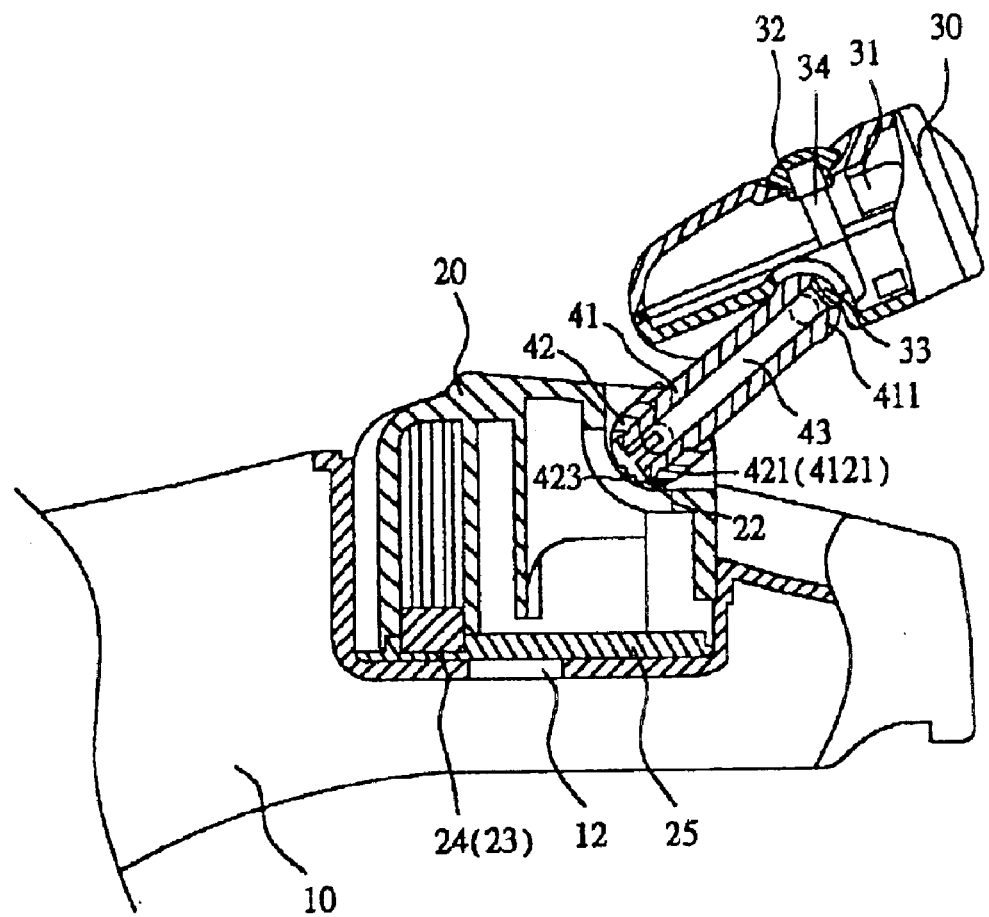
FIG. 7 is a view similar to FIG. 6 showing a pivotal operation of the illumination assembly.
Figure 8:
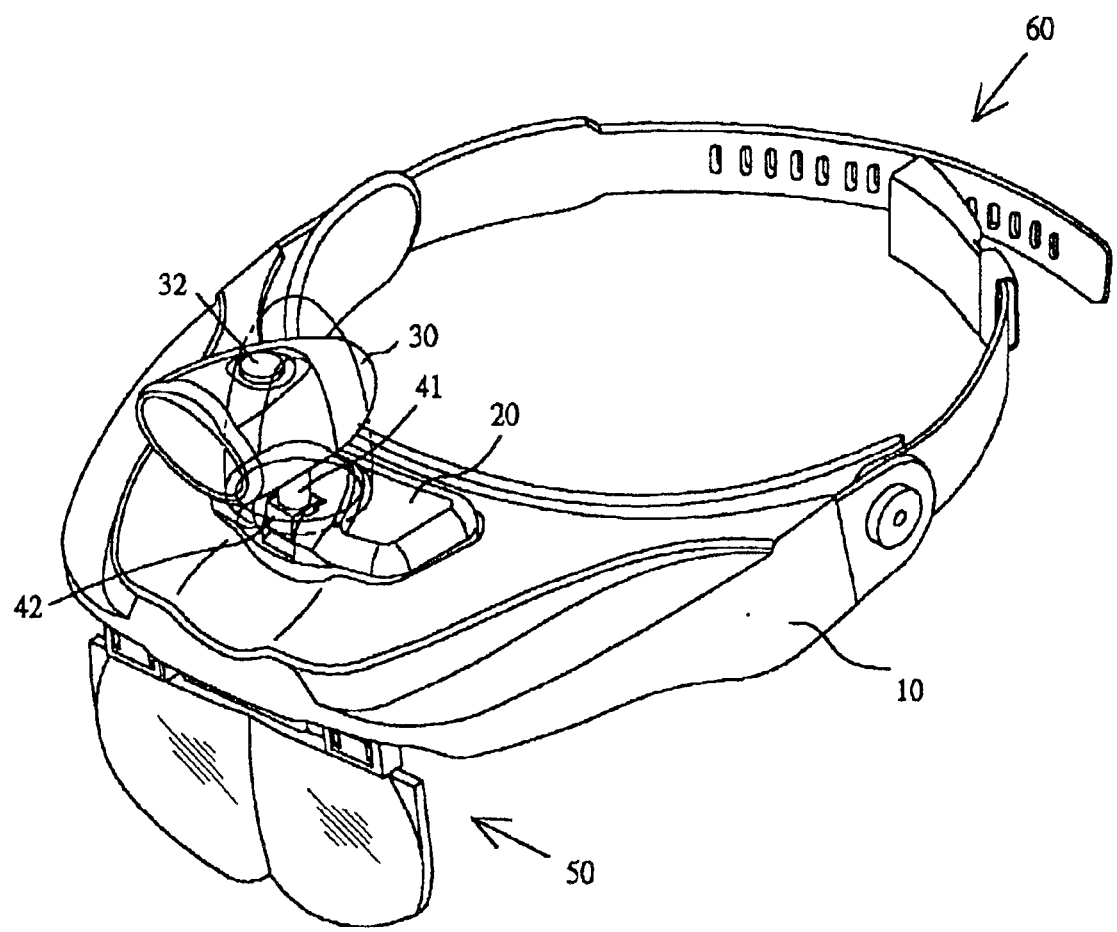
FIG. 8 is a perspective view showing an about 90 degrees pivotal operation of the illumination assembly.

Referring to FIGS. 6, 7, and 8, pivotal operations of the illumination assembly 30 and the connection assembly 40 are illustrated. The illumination assembly 30 is permitted to pivot in either horizontal or vertical direction in a large angle with respect to the connection assembly 40 and thus the battery compartment 20 because as stated above, the toothed member 423 of the base 42 is matingly, pivotably coupled to the ridge 22 (see FIGS. 6 and 7). Further, as shown in FIG. 8 the illumination assembly 30 still can pivot about 90 degrees even the flange 424 may contact and be stopped by the indentation 413.

Figure 9:
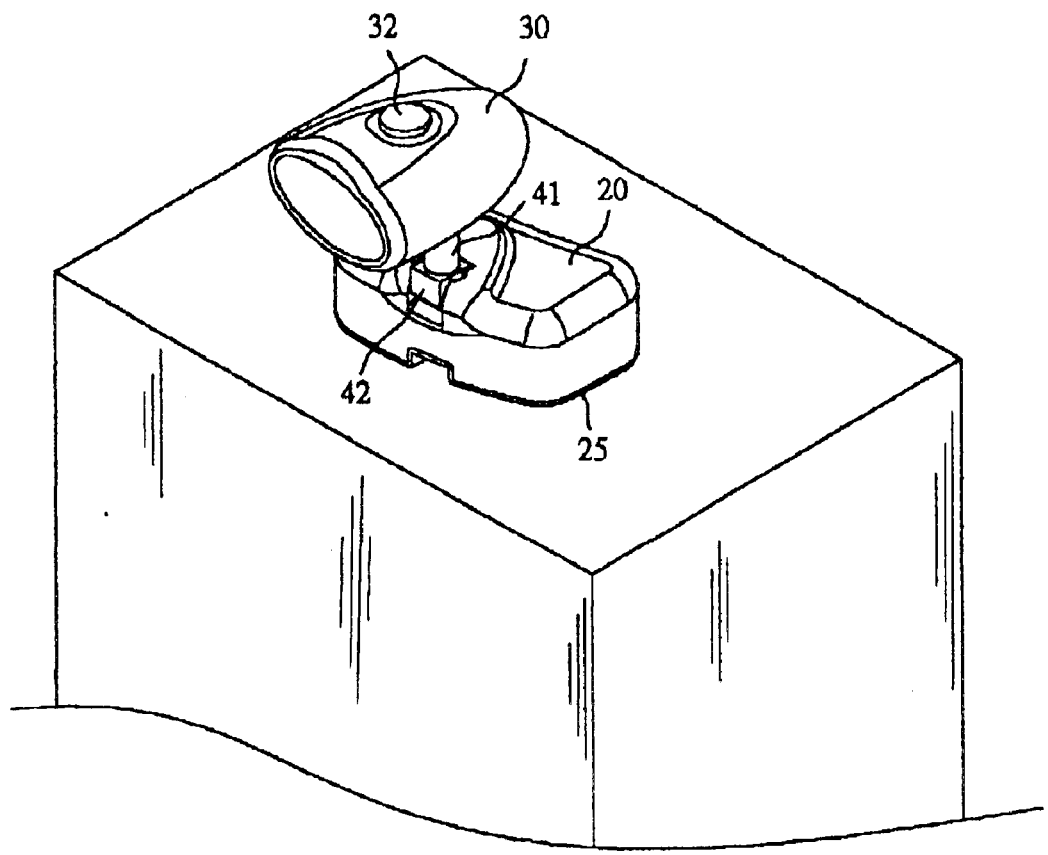
FIG. 9 is a perspective view showing the detached illumination assembly placed on a flat surface.
Figure 10:
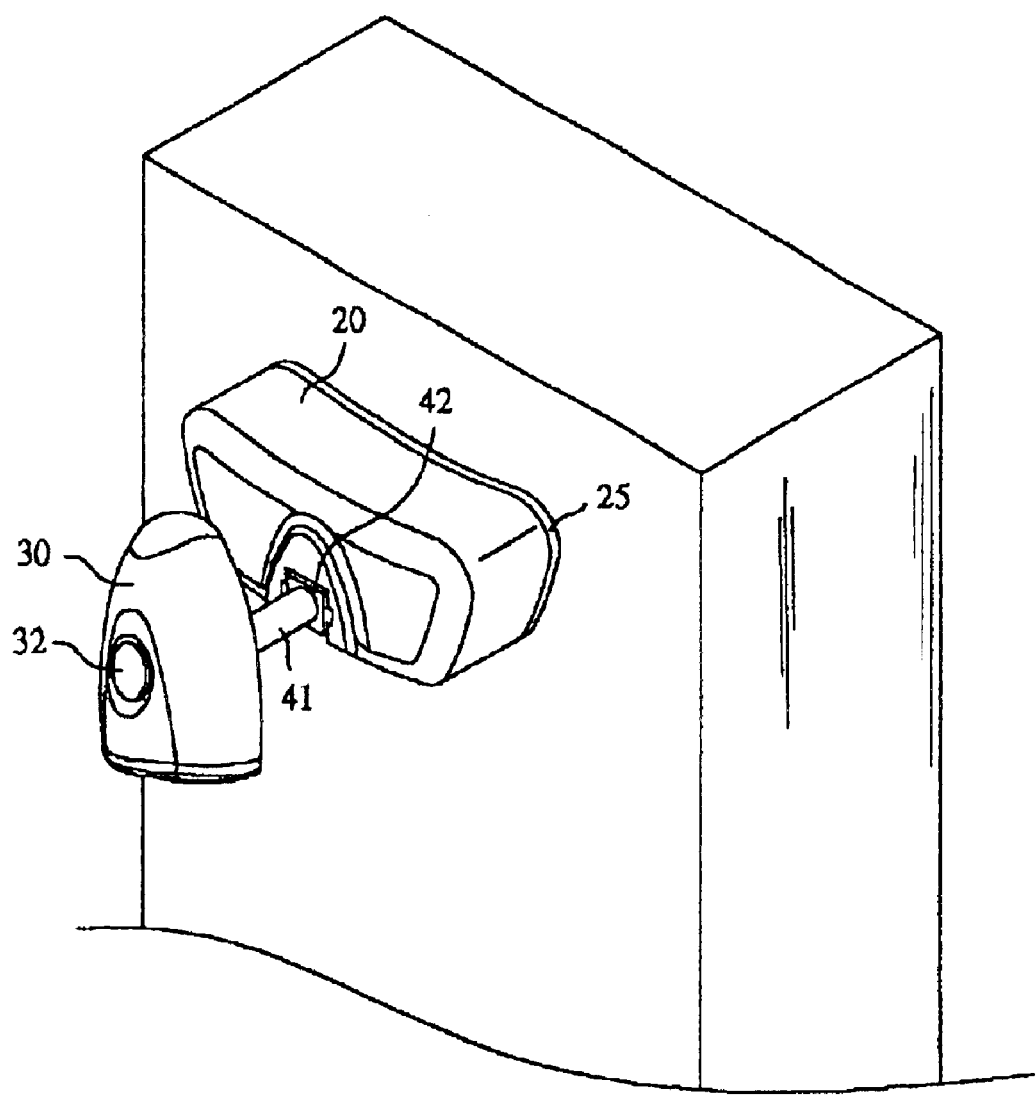
FIG. 10 is a view similar to FIG. 9 showing the detached illumination assembly mounted on a wall.

Referring to FIGS. 9 and 10 for detaching the assembly of the battery compartment 20, the illumination assembly 30, and the connection assembly 40, a user may insert a pointed object into the hole 12 to push the bottom of the battery compartment 20 upward until the magnet 24 is disengaged from the iron or steel member on the bottom of the well 11. The detached assembly of the battery compartment 20, the illumination assembly 30, and the connection assembly 40 may be placed on a flat surface (FIG. 9) or mounted on a wall (FIG. 10) as long as there is an iron or steel member provided thereon.

While the invention has been described by means of specific embodiments, numerous modifications and variations could be made thereto by those skilled in the art without departing from the scope and spirit of the invention set forth in the claims.

What is claimed is:

1. A headband comprising:

a front well having a bottom through hole and a magnetic member on a bottom;

a magnifying lens hingedly coupled to a front end of said headband; and a detachable assembly comprising:

a battery compartment received in the well, the battery compartment including one or more cells, a top recessed member, a ridge in the top recessed member, a bottom slotted section, a magnet in the slotted section for magnetically connecting to a magnetic member, and a bottom cover;

an illumination assembly comprising a LED lamp operably connected to the battery compartment via an on/off switch, an arcuate bottom recess, and a cavity inside the bottom recess; and a connection assembly comprising a hollow T-shaped post including a top pivot member at one end thereof and a bottom pivot member at an opposite end thereof and having a peripheral groove, and two rounded projections at both sides of the top pivot member for pivotably coupling to the cavity; and a hollow, parallelepiped base including an interior peripheral protrusion matingly coupled to the groove, two opposite side pins pivotably coupled to the recessed member, a bottom toothed member matingly, pivotably coupled to the ridge, and electrically connecting the cells to the illumination means;

wherein in an operation of detaching the detachable assembly, insert a pointed object into the hole to push the battery compartment upward for disengaging the magnet from the magnetic member.

2. The headband of claim 1, wherein the T-shaped post further comprises an indentation proximate the bottom pivot member and, further comprising a base having a peripheral flange on an interior surface so as to limit pivot angles of the post and the illumination means by causing the flange to contact the indentation during pivoting.

* * * * *